(12) United States Patent  (10) Patent No.: US 8,986,825 B2
Mortimer et al.  (45) Date of Patent: Mar. 24, 2015

(54) CURING AGENTS

(75) Inventors: Steve Mortimer, St. Ives (GB); Neal Patel, Ely (GB); John Cawse, West Wratting (GB)

(73) Assignee: Hexcel Composites Limited, Cambridge (GB)

( * ) Notice: Subject to any disclaimer, the term of this patent is extended or adjusted under 35 U.S.C. 154(b) by 265 days.

(21) Appl. No.: 13/579,230

(22) PCT Filed: Mar. 1, 2011

(86) PCT No.: PCT/GB2011/050412
§ 371 (c)(1),
(2), (4) Date: Aug. 15, 2012

(87) PCT Pub. No.: WO2011/107796
PCT Pub. Date: Sep. 9, 2011

(65) Prior Publication Data
US 2012/0316262 A1  Dec. 13, 2012

(30) Foreign Application Priority Data
Mar. 5, 2010 (GB) .................................. 1003643.2

(51) Int. Cl.
*B32B 27/38* (2006.01)
*B32B 5/02* (2006.01)
*C08L 63/00* (2006.01)
*C08G 59/50* (2006.01)
*C07C 211/56* (2006.01)

(52) U.S. Cl.
CPC .................................. *C08G 59/5033* (2013.01)
USPC ........ 428/297.4; 428/413; 523/428; 564/330; 564/331; 564/333; 564/335

(58) Field of Classification Search
None
See application file for complete search history.

(56) References Cited

U.S. PATENT DOCUMENTS

| 4,950,792 | A | * | 8/1990 | Althaus et al. ................. 564/335 |
| 4,978,791 | A | | 12/1990 | Voelker et al. |
| 5,312,651 | A | * | 5/1994 | Takada et al. ................. 427/386 |
| 8,536,297 | B2 | * | 9/2013 | Schreiber et al. ............... 528/68 |

FOREIGN PATENT DOCUMENTS

| DE | 2339237 A1 | 2/1975 |
| GB | 120377 A | 9/1970 |
| JP | H05132540 | 5/1993 |
| WO | 2005/030893 A1 | 4/2005 |
| WO | WO 2011084602 A1 * | 7/2011 | ............. C08G 18/10 |
| WO | WO 2012028323 A1 * | 3/2012 | ............. C08G 18/10 |

* cited by examiner

*Primary Examiner* — Michael J Feely
(74) *Attorney, Agent, or Firm* — W. Mark Bielawski; David J. Oldenkamp

(57) ABSTRACT

The invention relates to a resin curing agent having the formula (I), wherein $R_1$ to $R_4$ are each individually selected from linear or branched $C_1$ to $C_5$ alkyl, a process for its manufacture, blends of the reaction products, and two-component curable resin systems.

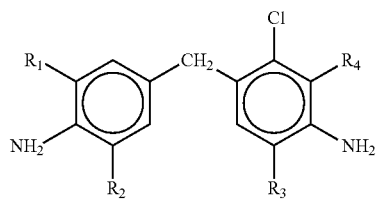

(I)

17 Claims, No Drawings

CURING AGENTS

TECHNICAL FIELD

The present invention relates to novel materials suitable for use as resin curing agents, particularly for epoxy resins, and which are liquid at room temperature.

BACKGROUND

Curing agents, or hardeners, are employed to react with a resin monomer, such as epoxy, isocyanate, acid anhydride etc., to produce a cured polymeric resin.

The resulting cured resins are employed in a wide range of industries and in a wide range of applications. The chemical and physical properties of the resulting cured resins vary widely, primarily depending upon the choice of monomer and of the curing agent.

There is ongoing demand for curable resin systems which can provide improved physical and chemical properties, particularly for use in demanding applications, such as for use in aerospace composite materials.

In one common application, a liquid blend of resin monomer and curing agent is injected or infused into a fibrous reinforcing structure, e.g. in the so-called resin transfer moulding or infusion processes. This involves preparing a liquid blend comprising both the curable resin and curing agent at an elevated temperature so as to reduce the viscosity ready for infusion. The curing agent must therefore have low reactivity to prevent premature reaction occurring before infusion takes place. Following infusion, the composite material produced is cured by exposure to elevated temperature to produce the cured composite material.

Traditionally, such liquid blends are produced as a one-component system, combining the resin monomer and curing agent intimately mixed together. This is convenient as it allows the end user merely to introduce one composition into the fibrous reinforcement. Such one-component systems are typically semi-solids at room temperature and only become liquid at an elevated temperature, e.g. from 60° C. to 100° C., when required for use. As the curing agent and the resin are together in the same material, a curing agent must be selected to have low reactivity. The low reactivity must also be maintained at the increased temperature when the composition becomes a flowable liquid.

A particularly convenient type of curing agent are the aromatic amines, as these provide good structural performance together with low reactivity. The known aromatic amines which give good mechanical performance in the cured resin are all solid at room temperature.

However, the inherent reactivity between resin monomer and curing agent can never be removed entirely, even when in solid form, and this limits the volume of material that can be transported and presents thermal hazard situations. Additionally, if a UN4.1 transportation category is defined, then, for such one-component curable resin compositions, sea transportation is difficult and air transportation forbidden.

Further improvements in the area of curable resin compositions which can produce cured resins suitable for use in structural applications would therefore be highly desirable.

SUMMARY OF INVENTION

The present inventors have realised that significant improvements may be obtained by taking the innovative step of moving away from a one-component system. If, for example, a two-component system can be developed, involving physically separating the monomer from the curing agent, this could eliminate any problems associated with undesirable reaction during transport and storage. Such two-components systems, however, involve the additional step of the end user having to mix the two components together prior to use.

However, as discussed, the aromatic amine curing agents known to be able to provide excellent structural mechanical properties in the cured resin together with low reactivity are crystalline solid at room temperature. Incorporating these curing agents in a two-component system would therefore also require a heating and melting step prior to during and after mixing and therefore becomes inconvenient for the end user.

Liquid aromatic amines are known, but have reactivities which are unacceptably high so that there is premature reaction before impregnation occurs.

It is possible to blend the solid aromatic amines with other liquid aromatic amines, but known liquid aromatic amines give poor mechanical performance in the cured resin and have undesirable high reactivities.

Thus, arriving at a two-component liquid curative system which has low reactivity and yet is capable of producing a cured resin system having mechanical properties suitable for use in a structural application, particularly in an aerospace application, does not seem possible with known systems.

Nevertheless, the inventors have made innovative developments to deal with these difficulties. Thus, in a first aspect, the present invention relates to curing agents having the formula

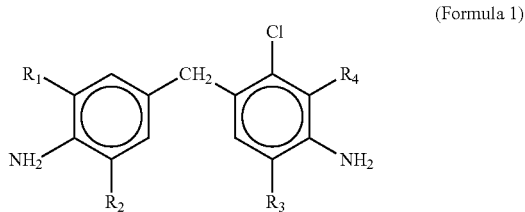

(Formula 1)

Wherein $R_1$ to $R_4$ are each selected from linear or branched $C_1$ to $C_5$ alkyl.

Such materials would ordinarily be referred to as methylene bis-anilines, were it not for the lack of symmetry between the two aniline rings. Nevertheless, for convenience, such materials will be referred to herein as hybrid methylene bis-anilines. Such hybrid methylene bis-anilines have been found to be liquid at room temperature, yet produce cured resin systems, particularly with epoxies, having excellent mechanical properties suitable for use in structural applications, particularly aerospace applications.

Thus, they can be successfully employed as part of a two-component liquid curable resin composition.

References herein to the terms "liquid" or "liquid at room temperature" means that the materials concerned have a melting point of less than 25° C., preferably less than 20° C., and do not crystallise over time.

These materials may be conveniently obtained, in a second aspect of the invention, by reacting together two anilines with the following structures:

[Structures shown: Aniline A with substituents $R_1$ (ortho to $NH_2$) and $R_2$; Aniline B with Cl, $R_4$, $NH_2$, and $R_3$ substituents]

Aniline A   and   Aniline B in an acidic medium with formaldehyde or compounds that form formaldehyde.

For example, the formaldehyde may be in the form of formalin solution, paraformaldehyde or trioxane or other well-known forms of free or combined formaldehyde.

The weight ratio of aniline A to aniline B may vary between a wide range. However, it has been found that generally more hybrid methylene bis-aniline is formed when the amounts of aniline A and aniline B are comparable. Thus, preferably the weight ratio of aniline A to aniline B is from 4:1 to 1:4, more preferably from 2:1 to 1:2.

Such a reaction inevitably results in formation of A-A and B-B symmetrical bis-anilines as well as the desirable A-B hybrid methylene bis-aniline.

Thus, in a third aspect the invention relates to a blend of methylene bis-anilines A-A, B-B and A-B, obtainable by reacting together the anilines A and B which are different to each other, as defined above in an acidic medium with formaldehyde or compounds that form formaldehyde.

Such blends have also been found to be liquid at room temperatures despite the presence of the symmetrical bis-anilines, and that they provide cured resins with excellent mechanical properties.

However, preferably the blend will comprise at least 30 wt %, preferably at least 40 wt %, more preferably at least 50 wt %. of the hybrid methylene bis-aniline A-B, i.e. Formula 1.

$R_1$ to $R_4$ are each either a straight-chain or branched $C_1$ to $C_5$ alkyl group. Preferably they are each a straight-chain or branched $C_1$ to $C_4$ alkyl, more preferably a $C_1$ to $C_3$ alkyl group. Such control over the R groups has been found to be necessary in order for the hybrid bis-aniline to remain liquid whilst providing good structural performance.

A particularly preferred molecule is wherein $R_1$ is $CH_3$, $R_2$ is $CH(CH_3)_2$, $R_3$ is $C_2H_5$ and $R_4$ is $C_2H_5$.

As discussed above, the hybrid methylene bis-anilines according to the invention are suitable for use in a two-component liquid resin curing system. Thus, in a fourth aspect, the invention relates to a two-component resin curing system, comprising a first liquid component comprising a hybrid methylene bis-aniline as herein described and a second liquid component comprising a curable resin.

In such a two-component system, typically the first liquid component comprises at least 50 wt % of the hybrid methylene bis-aniline (i.e. Formula 1) or the blend including the hybrid methylene bis-aniline according to the invention. Typically the second component will comprise at least 50 wt % of liquid curable resin.

In a fifth aspect, the invention relates to the process of mixing together the two components of the fourth aspect, to form a mixture, then curing the mixture by exposure to elevated temperature.

In a sixth aspect, the invention relates to a cured resin obtainable by the process according to the fifth aspect of the invention.

Preferably the cured resin, without any structural fibres being present has at least one, preferably at least two, more preferably all of the following physical properties: a dry Tg of greater than 170° C., a wet Tg of greater than 150° C., and a modulus of greater than 3.0 GPa.

Typically the mixture is infused or injected into a structural fibre arrangement, known as a fibre perform, before curing. For example, the structural fibre arrangement may be a structural layer of fibres.

In a preferred embodiment, the cured resin takes the form of a structural component, e.g. an aerospace structural component.

The fibres in the structural fibre layers of the perform may be uni-directional, fabric form or multi-axial. The arrangement of the fibres in neighbouring layers may be orthogonal to each other in a so-called 0/90 arrangement, signifying the angles between neighbouring fibre layers. Other arrangements such as 0/+45/−45/90 are of course possible among many other arrangements.

The fibres may comprise cracked (i.e. stretch-broken), selectively discontinuous or continuous fibres.

The structural fibres may be made from a wide variety of materials such as glass, carbon, graphite, metallised polymers aramid and mixtures thereof. Carbon fibres are preferred.

The curable resin may be selected from epoxy, isocyanate and acid anhydride, for example. Preferably the curable resin is an epoxy or an isocyanate resin.

Suitable epoxy resins may comprise mono functional, difunctional, trifunctional and/or tetrafunctional epoxy resins.

Suitable difunctional epoxy resins, by way of example, include those based on; diglycidyl ether of Bisphenol F, Bisphenol A (optionally brominated), phenol and cresol epoxy novolacs, glycidyl ethers of phenol-aldelyde adducts, glycidyl ethers of aliphatic diols, diethylene glycol diglycidyl ether, aromatic epoxy resins, aliphatic polyglycidyl ethers, epoxidised olefins, brominated resins, aromatic glycidyl amines, heterocyclic glycidyl imidines and amides, fluorinated epoxy resins, or any combination thereof.

Difunctional epoxy resins may be preferably selected from diglycidyl ether of Bisphenol F, diglycidyl ether of Bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenyls, aromatic glycidyl amines, heterocyclic glycidyl imidines and amides, fluorinated epoxy resins, or any combination thereof.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY721 from Huntsman Advanced Materials).

The invention will now be illustrated, by way of example.

EXAMPLES

Examples 1 to 5 show the preparation of curing agents. Examples 6 and 7 show cured epoxy resin systems.

Comparative Example 1

Synthesis of M-DEADIPA 35 ml propan-2-ol, 65 ml water and 15.4 ml concentrated sulphuric acid were mixed and added to 21.9 grams of 2,6- diethylaniline (DEA) and 28.1 grams of 2,6-diisopropylaniline (DIPA) in a 500 ml reaction flask provided with a mechanical stirrer. The resulting crystalline slurry was heated to 60° C. with stirring, and 13.3 ml of a 35% w/w aqueous formaldehyde solution was added over 30 minutes. The slurry gradually became lower in viscosity and visibly clearer. After 5 hours the mixture had once again become opaque, and was cooled to room temperature before neutralising with 35% ammonia solution. The product was extracted with chloroform (in which the mixture was fully soluble), and washed with distilled water. The clear organic phase was dried over sodium sulphate, filtered and the solvent removed by rotary film evaporation. 49 grams of a clear amber viscous liquid was obtained. Crystallisation could be seen in this product after 14 days at room temperature.

Thus, although a hybrid methylene bis-aniline was produced, it was not a stable liquid.

Comparative Example 2

Synthesis of M-MIPADEA

The conditions of Example 1 were used except that the amine mixture was 2-methyl-6-isopropylaniline (MIPA) and 2,6-diethylaniline (DEA). A series of reactions was conducted in which the MIPA to DEA ratio was varied using 14.71 ml of Formalin Solution as the source of formaldehyde. The quantities used are shown below.

TABLE 1

| | Starting Materials | | Reaction Products | | |
|---|---|---|---|---|---|
| Example | MIPA, g | DEA, g | MMIPA % | MDEA % | Hybrid % |
| 2.1 | 8.3 | 41.5 | 2.8 | 74.9 | 22.3 |
| 2.2 | 16.7 | 33.3 | 7.8 | 49.7 | 42.5 |
| 2.3 | 25 | 25 | 21.0 | 29.0 | 49.0 |
| 2.4 | 33.3 | 16.7 | 37.7 | 9.9 | 52.4 |

Note: acid mix=127 ml of a mix of 194 ml propan-2-ol, 359 ml water, 85.2 ml of conc. Sulphuric acid

TABLE 2

| Example | Stability to crystallisation |
|---|---|
| 2.1 | Crystallised immediately after rotary film evaporation |
| 2.2 | Crystallised within 1 hour of isolation |
| 2.3 | Crystallised after 3 days |
| 2.4 | Crystallised after 2 weeks |

The product from Example 2.4 showed some liquid phase after 2 weeks, but the majority of the product had crystallised and the mix could not be poured out of its vessel without first warming to melt the crystals.

Comparative Example 3

Preparation of a Blend of M-MIPA and M-DEA 25 g of M-MIPA and 20.3 g M-DEA were melted by heating at 100° C. The two liquid curatives were then blended together and allowed to cool to room temperature to form a viscous brown semi-solid. Crystallisation occurred within 1 day.

Example 4

Synthesis of M-MIPACDEA

In a 5 liter flanged reaction vessel were placed a mixture of 137 ml of sulphuric acid, 580 ml water and 313 ml propan-2-ol. To this were added 250 grams of 3-chloro-2,6-diethylaniline and 203 grams of 2-methyl-6-isopropylaniline. The flask was provided with a stirrer, dropping funnel and condenser and the temperature was raised to 60° C.

Formalin solution (35% w/w), 120 ml, was added over a period of 1 hour and heating was subsequently continued for 5 hours. The vessel contents were cooled and neutralised with ammonia solution.

The product was extracted into ethyl acetate, washed with water, dried over sodium sulphate, filtered and rotary evaporated to give 467 grams of an amber liquid.

Analysis by HPLC showed that the desired hybrid methylene bis-aniline M-MIPACDEA is present at 63% of the total, together with 15% of M-MIPA and 21% of M-CDEA.

The liquid showed no sign of crystallisation over 3 months.

Comparative Example 5

Preparation of a Blend of M-MIPA and M-CDEA 25 g of M-MIPA and 20.3 g M-CDEA were melted by heating at 100° C. The two liquid curatives were then blended together and allowed to cool to room temperature to form a viscous brown semi-solid. Crystallisation occurred within 1 day.

Comparison of this example with example 4 shows that the hybrid bis-aniline is essential in obtaining a stable liquid composition at room temperature.

Example 6

Preparation of a Formulated Resin Based on M-MIPACDEA 100 g of MY721 epoxy resin (Huntsman Advanced Materials, Switzerland) was mixed with 76.3 g M-MIPACDEA curative obtained under Example 4 at a temperature of 80° C. to form a homogeneous blend.

Comparative Example 7

Preparation of a Formulated Resin Based on a Blend of M-MIPA and M-CDEA 100 g of MY721 epoxy resin (Huntsman Advanced Materials, Switzerland) was mixed with a 34.3 g M-MIPA and 41.9 of MCDEA curative at a temperature of 80° C. to form a homogeneous blend. The M-MIPA and M-CDEA were pre-melted at 100° C. until fully liquid.

Comparison of the Properties of Examples 6 and 7

The properties of example material 6 and 7 are compared with that of a commercial Resin Transfer Moulding resin, RTM6 (available from Hexcel) in the table below. Reactivity and Tg are similar to RTM6, making them suitable as aerospace liquid composite moulding.

However, as the curative of example 7 crystallises, it is not suitable for a two-component resin system. The curative of example 6, does not crystallise, has low reactivity and is therefore suitable for a two-component resin system.

TABLE 3

| Test | Units | RTM6 | Ex6 | Ex7 |
|---|---|---|---|---|
| DSC Tg Onset | °C. | −16.5 | −8.8 | −12.0 |
| DSC Tg Midpoint | °C. | −15.1 | −7.8 | −9.0 |
| DSC Peak Onset | °C. | 214 | 217 | 202 |
| DSC Peak | °C. | 242 | 251 | 244 |
| DSC DH | $Jg^{-1}$ | 411 | 392 | 432 |
| Tg Dry | °C. | 200 | 208 | 207 |
| Tg Wet | °C. | 167 | 186 | 180 |
| Isothermal viscosity@120° C. | mPas | 30 | 44 | 53 |
| Isothermal viscosity@120° C. after 60 minutes | mPas | 49 | 70 | 70 |
| Modulus | GPa | 3.3 | 3.7 | 3.7 |

It can be seen that the liquid hybrid bis-aniline used in example 6, whilst being a stable liquid at room temperature, also produces cured resins with excellent mechanical properties.

The invention claimed is:

1. A process of preparing a curing agent composition comprising reacting Aniline A and Aniline B

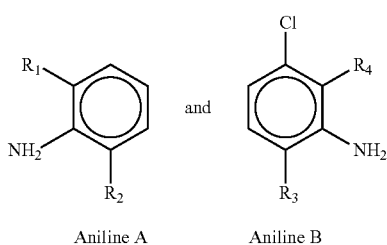

Aniline A    Aniline B in an acidic medium comprising formaldehyde or compounds that form formaldehyde to form a curing agent composition comprising a hybrid methylene bis-aniline of Aniline A and Aniline B, a methylene bis-aniline of Aniline A and a methylene bis-aniline of Aniline B, wherein the hybrid methylene bis-aniline is represented by the following formula I:

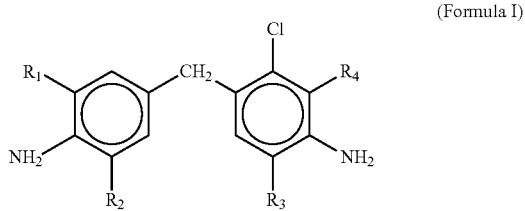

(Formula I)

wherein $R_1$ to $R_4$ are each individually selected from linear or branched $C_1$ to $C_5$ alkyl.

2. A process according to claim 1, wherein the weight ratio of Aniline A to Aniline B is from 4:1 to 1:4.

3. A curing agent composition made according to the process of claim 1 comprising: said hybrid methylene bis-aniline of Aniline A and Aniline B, said methylene bis-aniline of Aniline A, and said methylene bis-aniline of Aniline B.

4. A two component curable resin system, comprising a first liquid component comprising the curing agent composition according to claim 3, and a second liquid component comprising a curable resin.

5. A cured composition obtained by curing the two-component curable resin system according to claim 4.

6. The cured composition according to claim 5, which comprises a fibre arrangement.

7. The cured composition according to claim 6, wherein the fibre arrangement comprises a layer of structural fibres.

8. A The cured composition according to claim 5 having at least one of the following physical properties: a dry Tg of greater than 170° C., a wet Tg of greater than 150° C. and a modulus of at least 3.0 GPa.

9. The two-component curable resin system according to claim 4, wherein the first liquid component comprises at least 50 wt % of the hybrid methylene bis-aniline of Analine A and Aniline B.

10. The two-component curable resin system according to claim 4 wherein the second component comprises at least 50 weight percent of liquid curable resin.

11. The two-component curable resin system according to claim 4, wherein the liquid curable resin is an epoxy resin.

12. The curing agent composition according to claim 1, which comprises at least 30 wt % of said hybrid methylene bis-aniline of Aniline A and Aniline B.

13. The curing agent composition according to claim 1 wherein $R_1$ to $R_4$ are each a straight-chain or branched $C_1$ to $C_3$ alkyl group.

14. The curing agent composition according to claim 3 which is liquid at room temperature.

15. A process for making a two-component curable resin comprising the steps of:
providing the curing agent composition according to claim 3;
providing a curable resin; and
mixing said curing agent composition with said curable resin to said two-component curable resin.

16. The process according to claim 15 further comprising an additional step of combining said two-component curable resin with structural fibres.

17. The process according to claim 15 further comprising the additional step of curing said two-component curable resin.

* * * * *